(12) United States Patent
Ripsher et al.

(10) Patent No.: US 9,898,533 B2
(45) Date of Patent: Feb. 20, 2018

(54) AUGMENTING SEARCH RESULTS

(75) Inventors: Lawrence Ripsher, Seattle, WA (US);
Severan Rault, Redmond, WA (US);
Joseph Ollis, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 102 days.

(21) Appl. No.: 13/034,658

(22) Filed: Feb. 24, 2011

(65) Prior Publication Data

US 2012/0221551 A1    Aug. 30, 2012

(51) Int. Cl.
*G06F 17/30* (2006.01)

(52) U.S. Cl.
CPC ................ *G06F 17/30864* (2013.01)

(58) Field of Classification Search
None
See application file for complete search history.

(56) References Cited

U.S. PATENT DOCUMENTS

| | | | |
|---|---|---|---|
| 5,913,214 A | 6/1999 | Madnick et al. | |
| 7,065,483 B2 | 6/2006 | Decary et al. | |
| 7,412,442 B1 | 8/2008 | Vadon et al. | |
| 7,698,344 B2* | 4/2010 | Sareen et al. | 707/767 |
| 7,849,090 B2 | 12/2010 | Sweeney | |
| 9,009,135 B2* | 4/2015 | Gutlapalli | G06F 17/30 707/711 |
| 2006/0059416 A1 | 3/2006 | Lin | |
| 2006/0242266 A1 | 10/2006 | Keezer et al. | |
| 2007/0168331 A1 | 7/2007 | Reddy et al. | |
| 2007/0198727 A1 | 8/2007 | Guan | |
| 2007/0208706 A1* | 9/2007 | Madhavan et al. | 707/3 |
| 2007/0214119 A1 | 9/2007 | Ray et al. | |
| 2007/0276803 A1* | 11/2007 | Shakib et al. | 707/3 |
| 2008/0208846 A1 | 8/2008 | Panarese | |
| 2008/0250010 A1 | 10/2008 | Rathod et al. | |
| 2009/0150343 A1* | 6/2009 | English et al. | 707/3 |
| 2009/0254512 A1 | 10/2009 | Broder et al. | |
| 2009/0327281 A1 | 12/2009 | Young et al. | |

(Continued)

FOREIGN PATENT DOCUMENTS

| | | |
|---|---|---|
| WO | 0116806 A1 | 3/2001 |
| WO | 0135270 A1 | 5/2001 |

OTHER PUBLICATIONS

Definition of "correspondence" from google. Mar. 31, 2015.*

(Continued)

*Primary Examiner* — Ashish K Thomas
*Assistant Examiner* — Melissa M Ohba
(74) *Attorney, Agent, or Firm* — Shook, Hardy & Bacon, LLP

(57) ABSTRACT

Results of a search on one body of data are enhanced by performing the same search, or a related search, on another body of data. A first body of data is pages (or other content) on a web site, and a second body of data is pages (or other content) on another web site. When a user enters a query to perform a site-specific search on the first web site, that web site performs a related search on the second web site. When results are obtained from the second web site, it is determined whether the first web site has any pages that correspond to the received results. The first web site then uses the corresponding pages in the results that it provides to the user.

18 Claims, 5 Drawing Sheets

(56) References Cited

U.S. PATENT DOCUMENTS

| | | | |
|---|---|---|---|
| 2010/0010987 A1* | 1/2010 | Smyth | G06F 17/30867 707/E17.014 |
| 2010/0115024 A1 | 5/2010 | Song | |
| 2010/0146012 A1* | 6/2010 | Beaudreau et al. | 707/803 |
| 2010/0332491 A1 | 12/2010 | Cui et al. | |
| 2012/0271807 A1* | 10/2012 | Smyth | G06F 17/30864 707/706 |
| 2013/0238594 A1* | 9/2013 | Hong | G06F 17/30867 707/710 |

OTHER PUBLICATIONS

Arasu, et al., "Extracting Structured Data from Web Pages", Retrieved at << http://www.knowlesys.com/papers/webde/extracting_structured_data_from_web_pages.pdf >>, Proceedings of the 2003 ACM SIGMOD international conference on Management of data, Jun. 2003, 12 pages.
"Google site search", retrieved at << http://www.google.com/sitesearch/ >>, retrieved on Feb. 24, 2011, 2 pages.
"Bing Box", retrieved at << http://www.bing.com/siteowner/welcome.aspx >>, retrieved on Feb. 24, 2011, 1 page.
"International Search Report and Written Opinion of the International Searching Authority", dated Oct. 24, 2012, Application No. PCT/US2012/026382, Filed Date: Feb. 23, 2012, 8 pages.
"Search Report and Office Action Issued in Taiwan Patent Application No. 101104430", dated Sep. 24, 2015, 11 pages.
"Office Action and Search Report Issued in Taiwan Application No. 101104430", dated Apr. 27, 2016, 12 Pages.
"Search Report Issued in European Patent Application No. 12749652.9", dated May 3, 2016, 7 Pages.
"First Office Action and Search Report Issued in Chinese Patent Application No. 201210043354.5", dated Apr. 6, 2016, 14 pages.

* cited by examiner

AUGMENTING SEARCH RESULTS

BACKGROUND

Content providers often make their content searchable. There are various search technologies that can be deployed in order to make a particular provider's content searchable. For example, Google Site Search may be used to make a particular web site searchable, and the BING search engine provided by Microsoft Corporation may be used similarly. When one of these products is used, a web site may provide a search box that allows a user to search, and return results from, that web site.

When a content provider makes its content searchable in this way, users can find the content provider's documents based on how those documents have been indexed. For example, if documents are indexed based on the terms they contain, a site-specific search may turn up documents that contain the query terms. Or, if the documents have been indexed by some type of metadata, then documents associated with metadata that meets the terms of the query may appear in the search results. However, there may be relevant information about the documents that are not reflected in the index. When a search query uses such information, a site-specific search is not likely to identify the document if the document has not been indexed by the type of information that appears in the query.

SUMMARY

A site-specific search (or other type of search) may be augmented by using information from various content providers. Documents that are known to one content provider may be associated with documents that are known to another content provider (or that are known to a general web search engine). When a user enters a site-specific query on a first web site, that query (or another derivative query) may be executed by one or more other search providers (which may include another content provider's site that offers a site-specific search, or may include a general web search engine). When the query has been executed on the other search engine, the results are examined, and it is determined whether any of the results correspond to documents maintained by (or known to) the first web site. If so, then the documents on the first web site may be returned as results in the first web site's site-specific search.

For example, a first web site might provide a directory of restaurants, where each page in the directory corresponds to one of the restaurants. Each restaurant's page in the directory might be indexed by the business's name, address, zip code, and type of food, but might not be indexed by the number of seats in the restaurant. Thus, a query for "restaurant in Seattle with at least 150 seats" could not be answered using the index of the web site's pages. However, a second web site might maintain information about how many seats are in a given restaurant. Thus, in order to answer a query for "restaurant in Seattle with at least 150 seats", that query (or a derivative query) could be executed on the second web site's site-specific search. When the query is executed on the second web site, the results may include a particular restaurant. Software on the first web site's server can then determine whether the first web site has a directory page corresponding to that restaurant. If such a page does exist, then the first web site can return its own page for that restaurant based on the restaurant's having been identified by the second web site's site-specific search. In this way, the first web site provider can provide richer results than its own index would provide, while still answering a user's query with its own content (rather than directing the user to another provider's content).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
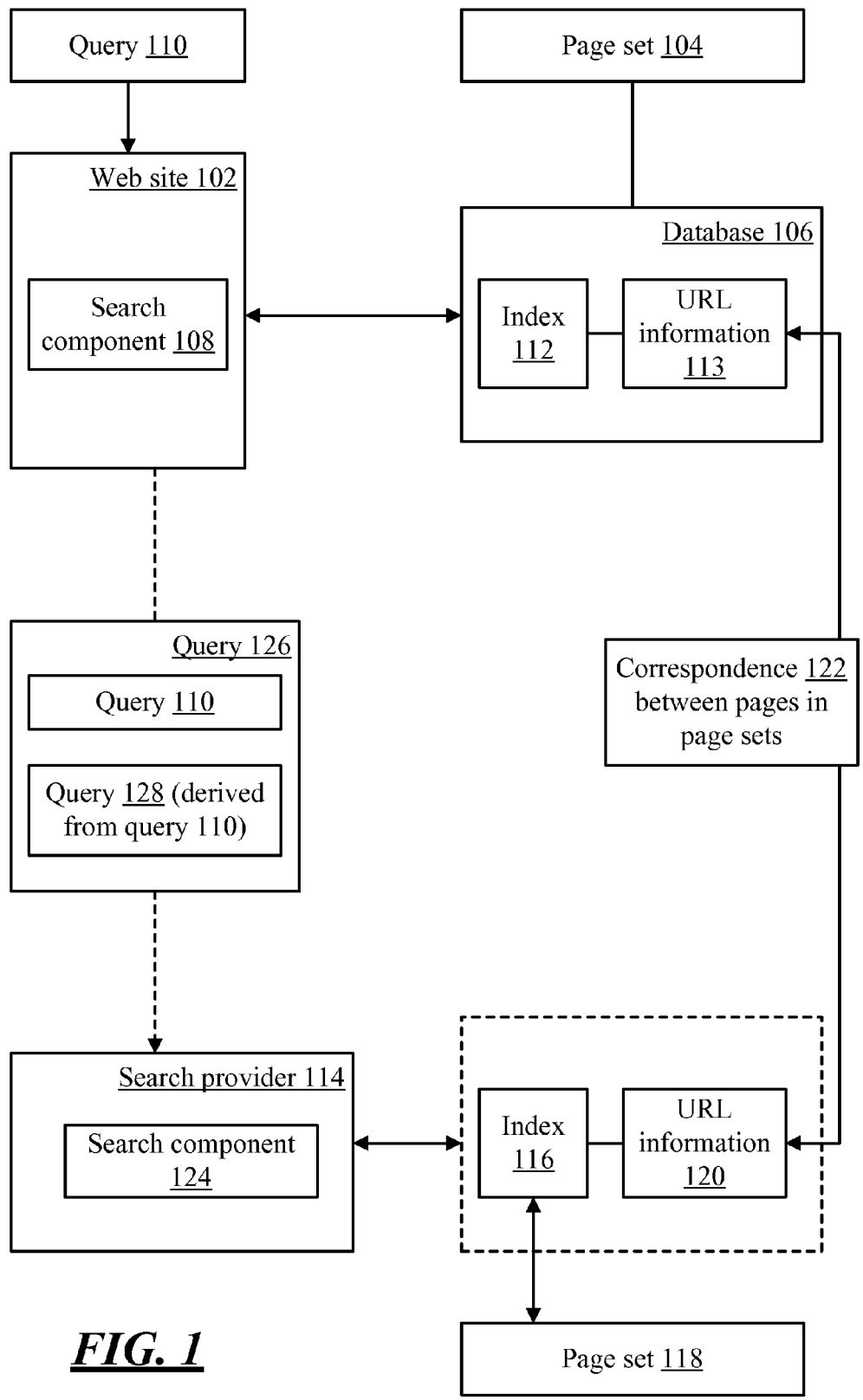
FIG. 1 is a block diagram of an example scenario in which a search may be performed.

Content providers often make their content searchable. Some content providers may make their content available to users through a web site. Although a content provider can install a general web search engine on its web site, many content providers like to make site-specific searches available on their web sites. Providing a site-specific search on a content provider's web site helps to direct users to the provider's own content. If the content has been monetized in some way (e.g., through paid advertisements), directing users to the content provider's own content may increase the content provider's revenues.

There are various way for a content provider to provide a site specific search. For example, a provider may install a site-specific version of the Google search engine or BING search engine on the provider's web site. When a user enters a query into a site-specific search box, the search engine returns pages from the web site's own content (e.g., web pages within the same domain as the web site). The results are based on the index entries for the content-provider's content. If the provider's content is indexed in a way that makes the content findable from the user's query, then the provider's content will appear in the search results. Otherwise, the provider's content does not appear in the search results. An index of the terms contained in documents is merely one way that a provider's content could be indexed. In another example, the content could be indexed based on metadata associated with documents, based on an entity-relationship model, or based on some other information.

A problem with this approach is that the provider may have content that is relevant to a particular user query, but that is not findable from the index. When the user cannot find what he or she wants on the provider's web site, the user may then search elsewhere. Or, the content provider may offer a broader search (e.g., a generalized web search), which can identify content that answers the user's query but that is not on the provider's web site. In either situation the user may be led away from the provider's web site. Since a web site often is monetized, directly or indirectly, based on how much time users spend on the web site, directing a user away from a particular content provider's web site may cause a loss of revenue for the content provider. Even if leading a user away from the web site does not directly cause a loss of revenue for the content provider, being unable to answer a particular query tends to devalue the web site, since it suggests that the web site cannot provide what users are looking for. The web site provider may have content that is highly relevant to the user's query, but that content may not be findable because of the limited way in which that content is indexed.

The subject matter described herein provides a way to leverage one corpus of content in order to return relevant material from another corpus of content. For example, two different web sites may maintain searchable records about restaurants. However, one site's record for a restaurant might contain different information than the other site's record for the same restaurant. E.g., site A's record might list the address, telephone number, and a set of reviews for the restaurant, while site B's record might have data such as the number of seats in the restaurant, the ambiance at the restaurant, and the type of food served. Thus, if one does a site-specific search on site A for a restaurant with 150 seats, the search may return no results, since site A's records do not say how many seats the restaurant has. A search for a restaurant with 150 seats on site B would return a record, but site A might not want to direct its user to site B's record. Using the subject matter described herein, site A may cause the "150 seats" search to be executed against site B's records. Then, having used the site B search results to identify a restaurant with 150 seats, site A may provide the user with its own record for the restaurant. In this way, various different content providers may leverage each other's knowledge bases in order to enhance search results for their own content. Moreover, a search provider may provide a tool that allows content providers to leverage each other's content in this way.

A correspondence may be established between records on site A and records on site B. One way to establish this correspondence is by the Uniform Resource Locators (URLs) of the businesses to which a record pertains. For example, a restaurant may have a web site located at a particular URL. Site A's records for that restaurant may include the restaurant's URL. Site B's records for the same restaurant may also include the restaurant's URL. Thus, when results are obtained from a site-specific search on site B, it is possible to use the URL of a restaurant listed in the results in order to determine which of site A's records relate to the same restaurant as the result returned by site B. Although the foregoing example discusses searches for restaurants, the subject matter herein applies to any type of information that can be searched—e.g., hotels, airlines, scientific literature, images, etc.

Turning now to the drawings, FIG. 1 shows an example scenario in which a search may be performed. In the example of FIG. 1, web site 102 is a web site that makes content available to users. Any type of content could be provided by web site 102—e.g., a directory of businesses, a database of scientific articles, a marketplace of items to be bought and sold, etc. In the discussion that follows, the running example that will be used is that of a site that offers a directory of restaurants. However, it will be understood that the subject matter herein is not limited to this example.

Thus, in the non-limiting example in which web site 102 provides a directory of restaurants, web site 102 may maintain a set of pages (page set 104), where each page in the set is an entry concerning a particular restaurant. Thus, one of the pages might be a listing for a restaurant named "El Groucho", and that page might contain the address of the restaurant, its telephone number, the type of cuisine served, forms of payment accepted, customer reviews of the restaurant, etc. Page set 104 may be stored in a database 106 that is maintained by web site 102. (Page set 104 is merely an example of a type of content; in general, a "content set" comprising any type of content items could be maintained.)

Web site 102 may contain a search component 108 that allows users of web site 102 to search page set 104 for content that meets certain criteria. Thus, a user may submit a query 110 to the search component 108 of web site 102, where the query contains the search criteria. In one example, the search component 108 provides a search box that allows the user to enters a text query, in which case the search criteria is whether a particular page in page set 104 contains the term(s) in query 110. However, query 110 could take other forms, and other search techniques could be used. For example, there could be metadata about the pages in page set 104, where the metadata describes features of the pages other than the text that the pages contain, and the search could determine whether the metadata that applies to a particular page satisfies query 110. Or, if the underlying data in page set 104 supports it, query 110 could be based on a more complex paradigm than merely a text query on the pages' content or metadata. For example, if the pages in page set 104 are organized in a relational database, then query 110 could be a relational (e.g., SQL) query. Or, if the pages in page set 104 follow an entity-relationship (E-R) model, then query 110 could be a SPARQL query. Any type of query could be processed by search component 108.

In one example, database 106 contains an index 112 of the pages in page set 104. Index 112 may identify the terms that appear in the pages of page set 104, or may identify the metadata that applies to those pages, or may contain any other type of information about the pages in page set 104. Search component 108 may use index 112 to determine which page in page set 104 satisfy a particular query. Database 106 does not necessarily contain an index. In one example, a general search engine provides web-site-specific search services for a particular web site by using its own index to find search results, while limiting the results to those pages that are part of the web site. In that case, the index may be maintained by the search engine provider.

Using the components of FIG. 1 that are described above, it is possible to search for information in page set 104. However, it is possible that one or more pages from page set 104 are responsive to the query, but would not be discovered based on what is known about page set 104. Thus, such pages might not be discovered by a search. The subject matter described herein may be used to enhance the results of a search of page set 104, using information outside of page set 104.

The pages in page set 104 may be associated with specific URLs. While a page in page set 104 may be located at a specific URL, for the purpose of enhancing the search results, it may be a different URL that is relevant, rather than the URL that describes the location of the page. The following is a specific example. As noted above, web site 102 may be a site that provides a directory of restaurants, so that each page in page set 104 is the directory entry for a specific restaurant. Web site 102 might be named "restaurantsearch.example.com", and the restaurant named "El Groucho" might be one of the restaurants listed in the directory. The page that contains El Groucho's directory entry might have the URL restaurantsearch.example.com/elgroucho, but—for the purpose of enhancing a search of page set 104—this URL might not be the relevant URL. Rather, El Groucho might have its own web site, identified by the URL "elgroucho.example.com." That is, while "restaurantsearch.example.com/elgroucho" is the directory entry for El Groucho on the restaurantsearch.example.com web site, "elgroucho.example.com" is El Groucho's own web site. This latter URL is relevant to enhancing a search of page set 104, since any corpus of information that knows about the El Groucho restaurant is likely to know the URL of its web site. Thus, if there are any web sites (or other sources) that have information about restaurants and that know about the El Groucho restaurant, those sites (or other sources) are likely to refer—somewhere—to the "elgroucho.example.com" URL. In other words, it may be assumed that the various knowledge bases that contain information about the restaurant El Groucho will know the URL of that restaurant's web site, and this assumption may be used to link information from the different knowledge bases.

Thus, in the example where database 106 contains an index of page set 104, one piece of information that the index may contain is URL information 113, which indicates the URL to which each page in page set 104 relates. For example, index 116 may contain a list of the terms that appear in the page "restaurantsearch.example.com/elgroucho", and may also contain information showing that the page "restaurantsearch.example.com/elgroucho" refers to the restaurant whose web site is at "elgroucho.example.com". Another search provider 114 may have its own index 116 of some set of pages (page set 118). (It will be understood that page set 118 is not coextensive with page set 104—i.e., in theory, the two page sets might have some pages in common, but otherwise are not the same set.) Index 116 may include URL information 120, which identifies the URLs to which the pages in page set 118 relate. Since pages in page set 104 are associated with particular URLs, and since pages in page set 118 also are associated with particular URLs, it is possible to establish a correspondence 122 between the pages in page sets 104 and 118 through the URLs. For example, if page A is in page set 104 and contains a reference to the URL "elgroucho.example.com", and page B is in page set 118 and contains a reference to the URL "elgroucho.example.com", then it is possible to establish that page A corresponds to page B because both pages refer to the same URL. At a high level, the general idea is that page A and page B both refer to the same restaurant's web page, and thus it is likely that page A and page B are both about the same restaurant.

Since a correspondence can be established between web site 102's pages (page set 104) and search provider 114's pages (page set 118), it is possible to use this information to augment the search results that web site 102 provides on its own web page. Suppose, for example, that web site 102 is a restaurant directory and search provider 114 is (or operates) a restaurant reservation system. (It will be understood that a "search provider" does not have to be a general web search engine in the traditional sense. Any web site or other entity that provides some ability to search some body of information may be considered a "search provider" for the purposes herein.) Therefore, search provider 114 may have information about the seating capacity of restaurants, even though this information may not be available to web site 102. For this reason, if a user enters, into web site 102's search component 108 a query such as "restaurant in Seattle with at least 150 seats", this query may not be answerable using the index 112 of web site 102's page set. It may be the case that El Groucho the exact criteria specified in the query, and the operators of web site 102 would like to be able to return their own page on El Groucho in response to the query. But, since web site 102's page (i.e., the page at "restaurantsearch.example.com/elgroucho") contains no information about seating capacity, it is unlikely that a search of page set 104 would identify that page as a result.

However, web site 102 can use a search component 124 (which is provided by search provider 114) in order to search page set 118. Thus, web site 102 generates a query 126 to be executed by search provider 114. Query 126 may actually be the same as query 110. Or, query 126 may be a separate query 128 that is derived in some manner from query 110. For example, search provider 114 might provide a structured search in which the location of the restaurant is specified by a zip code range, and the seating capacity of the restaurant is specified as a numerical field. Thus, the query "restaurant in Seattle with at least 150 seats" might be converted to "98100-98199" (the range of zip codes that encompasses Seattle), and the text phrase "at least 150 seats" might be converted to "size>=150" (where "size", in this example, is the name of the field that represents the seating capacity).

Regardless of the form that query 126 takes, that query may be submitted to search provider 114 through search component 124. Search component 124 then causes a search of page set 118 to be performed using query 126. This search may generate some results from among page set 118.

Once the results have been generated, the correspondence 122 between the pages in page set 118 and the pages in page set 104 may be used to determine whether web site 102 has any pages (i.e., any pages in page set 104) that correspond to the results. For example, if search provider 114 is a restaurant reservation system, it might have the page "restaurantreservations.example.com/elgroucho" (which relates to the El Groucho restaurant), and that page might be one of the results in the search of page set 118. If that page references the "elgroucho.example.com" web site, then it can be determined that "restaurantreservations.example.com/elgroucho" relates to the same restaurant as "restaurantsearch.example.com/elgroucho", since (as mentioned above) both pages refer to the URL for the same restaurant's web site. Therefore, even though web site 102's search of its own page set might not have identified its own page on El Groucho as being relevant to the query, the fact that a page on the El Groucho restaurant was identified through a search of search provider 114's pages shows that the El Groucho restaurant is (or may be) relevant to the original query 110 that the user entered (i.e., "restaurant in Seattle with at least 150 seats"). Having determined that El Groucho is a relevant response to that query, web site 102—rather than returning search provider 114's result—may instead return its own page on El Groucho as a result to the requesting user. That is, even though the search engine result relating to El Groucho is search provider 114's own page on that restaurant (i.e., "restaurantreservations.example.com/elgroucho"), web site 102 may instead return its own page on El Groucho (i.e., "restaurantsearch.example.com/elgroucho"). In this way, web site 102 is able to direct users to its own relevant content, even if a site-specific search of web site 102's own content did not directly identify web site 102's content as being relevant.

Figure 2:
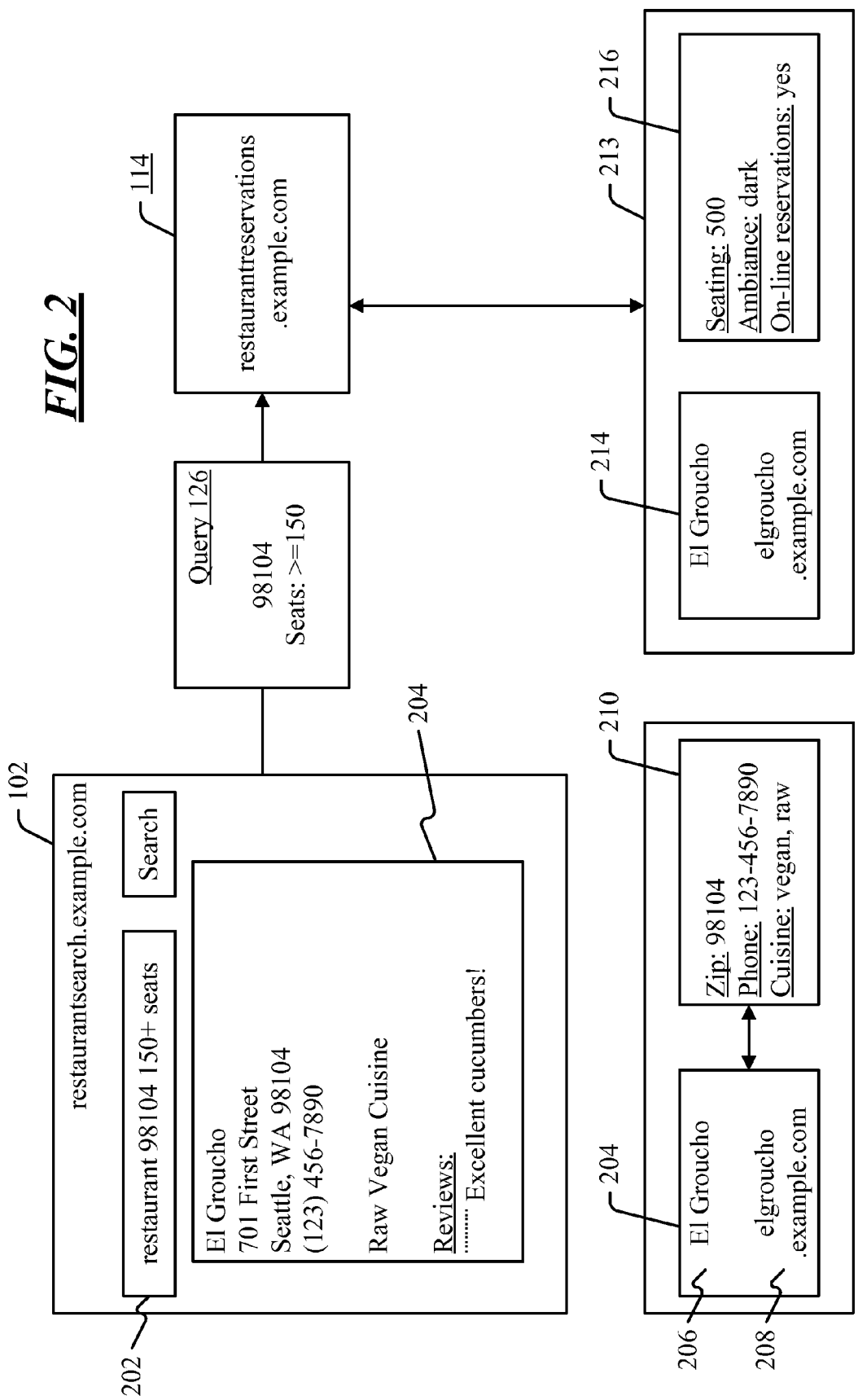
FIG. 2 is a block diagram of an example scenario in which a search on a web site is augmented by searching another entity's content.

FIG. 2 shows an example scenario in which a search on a web site is augmented by searching another entity's content. In the example of FIG. 2, web site 102 is the "restaurantsearch.example.com" web site described above in connection with FIG. 1. Web site 102 provides a search box 202, which allows visitors to web site 102 to enter a search query, in order to search the pages (or other content items) that are part of web site 102. One such page 204 is a directory entry for the El Groucho restaurant. That directory entity lists the name 206 of the restaurant, the URL 208 of the restaurant's web site, and other data 210 such as the restaurant's address, phone number, type of cuisine, etc.

The query 202 that a visitor to web site 102 has entered into search box 202 is "restaurant 98104 150+ seats". When a query processor processes this query, it may understand the query as a search for a restaurant in or near the 98104 zip code (which is in Seattle), with the additional criteria that the restaurant have at least 150 seats. The location criteria of the query (i.e., zip code=98104) can be answered with respect to web site 102's pages. As page 204 demonstrates, directory entries for restaurants that are maintained by web site 102 have zip code information. However, these pages may not have information about seating capacity. (At least in this example, the entry for El Groucho does not have that information.) Thus, the El Groucho restaurant might, in fact, have seating for 150, but the page for El Groucho might not be returned as a search results because the fact that El Groucho has seating for 150 cannot be determined from the information in page 204 (and, therefore, the index entries for page 204 presumably contain no information about whether El Grouch has seating for 150).

Thus, in order to attempt to answer the full query, web site 102 formulates query 126, and sends that query to the web site restaurantreservations.example.com. As discussed above, restaurantreservations.example.com may maintain operate an online reservation system, and thus may have data on how many seats exist in those restaurants for which it processes reservations. restaurantreservations.example.com is an example of search provider 114 (discussed above in connection with FIG. 1). Thus, web site 102 forwards query 126 to restaurantreservations.example.com, where query 126 specifies both a restaurant in or near the zip code 98104, and a restaurant that has at least 150 seats. A database 213 maintained by restaurantreservations.example.com may include a page 214 for the El Groucho restaurant, and may also include index information 216 relating to that page. In this example, the index information identifies the number of seats at El Groucho, the ambiance, and whether El Groucho accepts on-line reservations. This type of information may be information that web site 102 does not have about El Groucho, but some of this information happens to be relevant to processing the query 212 that the user entered. When the restaurantreservations.example.com web site responds to query 126, it may include its page 214 on El Groucho in the results.

As can be seen in FIG. 2, page 214 lists the URL of the El Groucho web site. (Again, not the URL of restaurantreservations.example.com's page about El Groucho, but rather the URL of El Groucho's own web site.) When the servers that operate web site 102 receive results that list page 214, they can use that URL to determine which of web site 102's own pages correspond to the result. As noted above, one way to determine which of web site 102's pages corresponds to the results is to match the URLs listed in the results with the URLs listed in web site 102's own page. Since web site 102 has a page 204 that also contains the URL of El Groucho's web site (elgroucho.example.com), web site 102 may determine that page 204 corresponds to the same restaurant as page 214, which was returned in restaurantreservations.example.com's search results. Thus web site 102 may present its own page 204 on El Groucho in the results that it provides web site 102's visitor, even though page 204 might not have been findable from the query 212 that the visitor entered.

Figure 3:
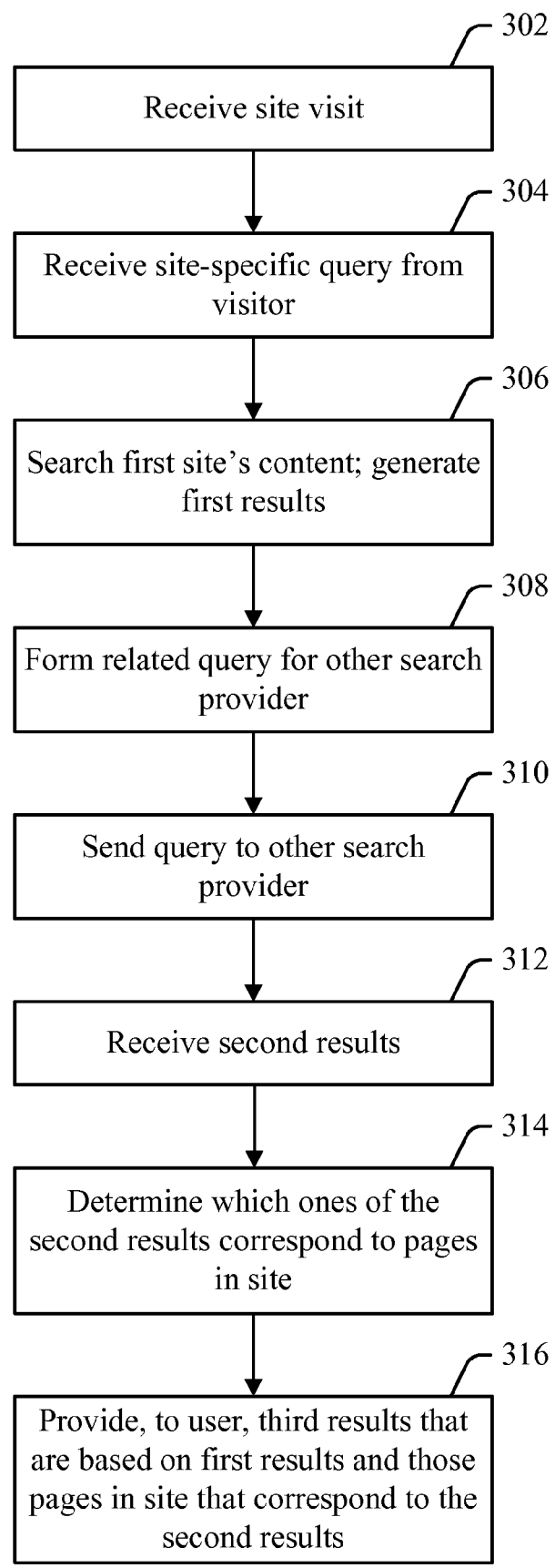
FIG. 3 is a flow diagram of an example process of allowing a site to provide site-specific search results using information received from another search provider.
Figure 4:
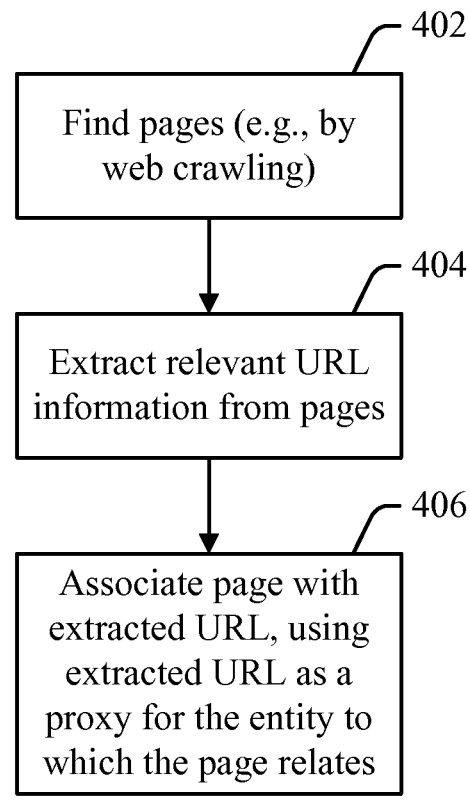
FIG. 4 is a flow diagram of an example process of establishing a correspondence between pages.

FIG. 3 shows an example process of allowing a site to provide site-specific search results using information received from another search provider. Before turning to a description of FIG. 3, it is noted that the flow diagrams contained herein (both in FIG. 3 and in FIG. 4) are described, by way of example, with reference to components shown in FIGS. 1 and 2, although these processes may be carried out in any system and are not limited to the scenarios shown in FIGS. 1 and 2. Additionally, each of the flow diagrams in FIGS. 3-4 shows an example in which stages of a process are carried out in a particular order, as indicated by the lines connecting the blocks, but the various stages shown in these diagrams can be performed in any order, or in any combination or sub-combination.

At 302, an entity that provides searchable content receives a visit from a visitor. For example, if the entity that provides searchable content is a web site, a user may visit the web site using a browser. As described above in connection with FIGS. 1 and 2, the site may provide a site-specific search function, where the user enters a query in order to search pages (or other content) on that site. At 304, such a query for a site-specific search may be received.

At 306, the site performs a site-specific search on its own content. Such a search may be performed, for example, by using site-specific search functionality provided through a general web search engine. E.g., a general web search engine, such as Google or BING, may offer site providers the ability to perform a search whose results are limited to pages on that site. The site-specific search may generate a first set of results.

Before providing the first set of results to the visitor, the site may attempt to augment those results using information from other search providers. As noted above, these other search providers may be search engines, databases, other web sites that provide site-specific search, etc. In order to augment the results in this way, the site may formulate a query to be executed by another search provider (at 308). The query is then sent to the other search provider (at 310).

The other search provider may then generate a second set of results, and this second set of results is received back (at 312) by the web site on which the user requested the original search. The web site may then determine which ones of the second results correspond to pages on that site (at 314). As noted above, one way to determine this correspondence is to determine whether a URL associated with one of the results in the second set of results corresponds to the URL associated with any of the pages on the web site. If such a correspondence exists, then the web site may wish to return its own page on that item, rather than the page identified in the other search provider's results.

Thus, the web site creates a third set of results which is based on both the first set of results and on those pages (or other content) on the web site that have been determined to correspond to results that appeared in the second set of results. The web site may create this third set of results by combining together the first set of results with the identified corresponding pages, or it may choose to modify this combination in some manner in order to create the third set of results. The third set of results may be provided to the site visitor at 316.

As noted above, the ability for a site-specific search to leverage results from another search provider may be based on establishing the correspondence between content available on the web site and content that appears in the other provider's search results. As also noted above, this correspondence may be established by determining that a page on the web site, and a page returned by the other search provider, both refer to the same third-party URL (which may be the URL of the entity to which the two pages refer). Thus, FIG. 4 shows an example process of establishing a correspondence between pages.

At 402, pages on various sites may be found. The process of finding pages may be performed, for example, by a web crawler that probes web sites to determine what content is available on those sites. At 404, relevant URL information is extracted from those pages. With reference to the example above, restaurantreservations.example.com/elgroucho may be a page that relates to the El Groucho restaurant, and that page may refer to the URL of El Groucho's own web site (elgroucho.example.com). In this case, elgroucho.example.com is the relevant URL to be extracted, since that URL is associated with the underlying entity to which the restaurantreservation.example.com page on El Groucho relates.

At 406, the page from which the relevant URL was extracted is associated with that page. In this way, the extracted URL acts as a proxy for the entity to which the extracted URL relates, thereby allowing it to be determined that two pages correspond to each other if they refer to the same URL.

It is noted that the techniques and mechanisms described above may be used to provide a site search. That is, these techniques may be offered by a search provider to implement a site-specific search on a web site; in such a deployment, these techniques provide value to the web site because they allow the web site to provide robust and accurate results from its own web site by leveraging information found elsewhere. However, these techniques and mechanisms may also be used by a general search provider (e.g., a web search engine) to enhance general web search results by leveraging searchable content provided by niche providers. (E.g., a general web search engine could enhance its ability to find restaurants by leveraging information found on the restaurant review or restaurant reservation site described above.)

Figure 5:
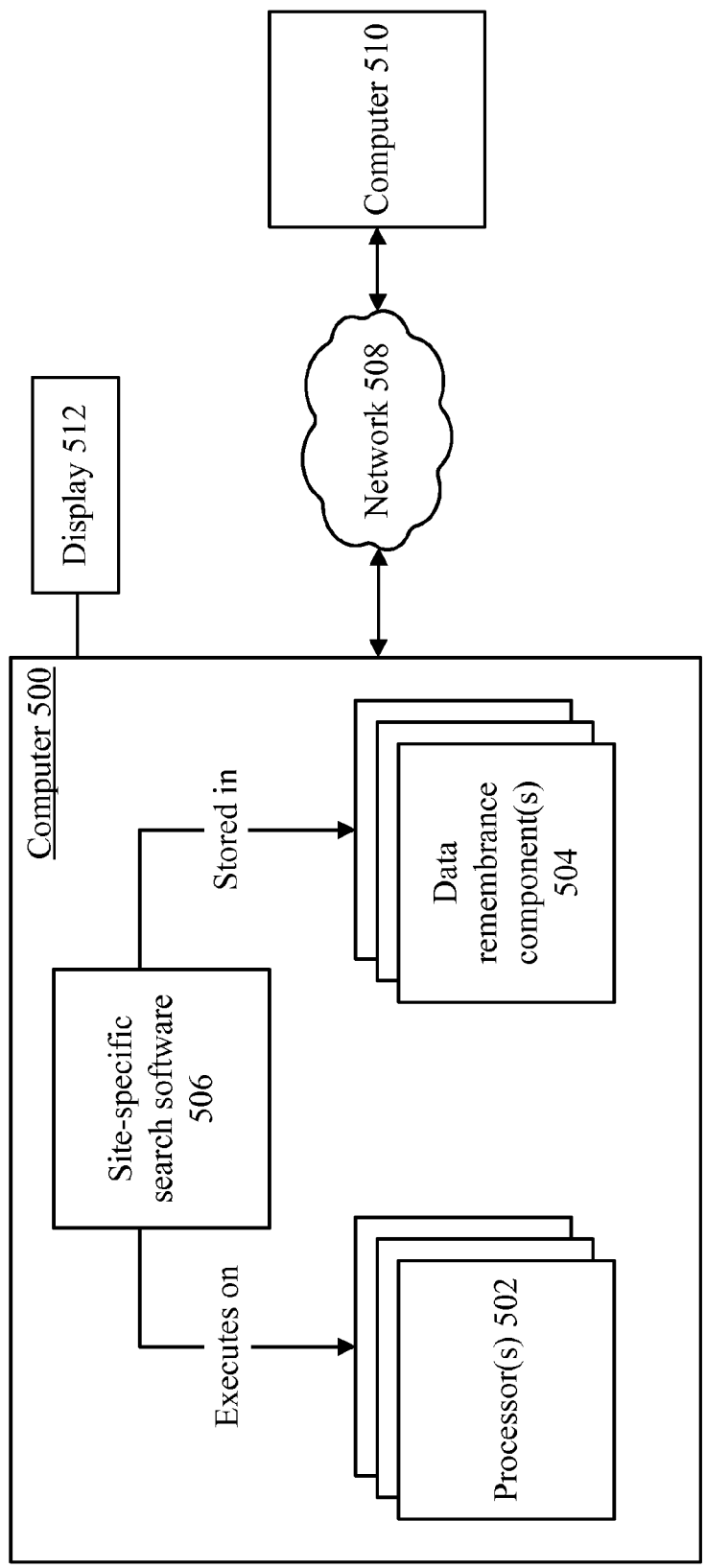
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor(s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is site-specific search software 506, which may implement some or all of the functionality described above in connection with FIGS. 1-4, although any type of software could be used. Software 506 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium. It is noted that there is a distinction between media on which signals are "stored" (which may be referred to as "storage media"), and—in contradistinction—media that contain or transmit propagating signals. DVDs, flash memory, magnetic disks, etc., are examples of storage media. On the other hand, wires or fibers on which signals exist ephemerally are examples of transitory signal media. Thus, it will be understood that a storage media is non-transitory.

Additionally, any acts described herein (whether or not shown in a diagram) may be performed by a processor (e.g., one or more of processors 502) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 500 may be communicatively connected to one or more other devices through network 508. Computer 510, which may be similar in structure to computer 500, is an example of a device that can be connected to computer 500, although other types of devices may also be so connected.

It is noted that various items in the claims may be described as being distinct from each other—e.g., one web site may be described as being "distinct" from another web site. When two items are distinct, it will be understood that they are not the same item. For example, if a.example.com and b.example.com are hosted by different servers, and/or offer non-identical content, then a.example.com and b.example.com are the URLs of two distinct web sites. It will also be understood that "the web" refers to the corpus of pages that are available in the surface World Wide Web.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computing device comprising:
   one or more processing units; and
   one or more computer-readable storage media comprising executable instructions, which, when executed by the one or more processing units cause the computing device to:
   receive a search request that comprises a first query comprising search terms, wherein the search request being specifically directed only to a first content set;

search said first content set to find a first set of results of content items in said first content set, wherein the search of said first content set can only satisfy a portion of search terms of the first query;

identify, from said first set of results, a first content item that references an entity and some of the search terms of the first query;

create a second query that comprises, or is derived from, the search terms of the first query not included in the satisfied search results of said first content set;

cause a searching of a second content set, different from said first content set, to find a second set of results of content items in said second content set that satisfy said second query;

identify, from said second set of results, a second content item that references the entity and the search terms of the second query;

determine a correspondence between said first content item and said second content item based on said first and second content items both referencing the entity;

based on said determining, augment said first set of results to include said second content item to generate an augmented first set of results; and provide said augmented first set of results in response to said search request.

2. The computing device of claim 1, wherein said first content set comprises a set of pages of a first web site, and wherein said second content set comprises a set of pages of a second web site that are different from said first web site.

3. The computing device of claim 1, wherein said second content item is distinct from said first content item.

4. The computing device of claim 1, wherein said entity is distinct from both said first and second content items.

5. The computing device of claim 1, wherein said second query is different from said first query.

6. The computing device of claim 1, wherein said first content set comprises content that is provided by a web site, and wherein said searching of said first content is a site-specific search of said web site.

7. The computing device of claim 1, wherein said first content set comprises the web, and wherein a search provider is a web site that provides niche searches of content and is used to augment results of a web search.

8. The computing device of claim 5, wherein the second query is a structured query comprising a field name for a field and a numerical value assigned to the field.

9. The computing device of claim 1, wherein said first content item references said entity by comprising a Uniform Resource Locator (URL) identifying a web page of said entity; wherein said second content item references said entity by also comprising said URL identifying said web page of said entity; and wherein further said web page of said entity is independent of said first content set and said second content set.

10. A method of augmenting results of a search, the method comprising:
using a processor to perform acts comprising:
receiving a search request that comprises a first query comprising search terms, wherein the search request being specifically directed to only content from a first web site;
identifying a first set of pages of said first web site, wherein the identifying the first set of pages of said first web site can only satisfy a portion of search terms of the first query;
sending a second query to a search provider that searches at least one web site that is different from said first web site, wherein said second query comprises, or is derived from, the search terms of the first query not included in the satisfied portion identifying the first set of pages of said first web site;
receiving, from said search provider, a first set of results in response to the sending of the second query;
determining that both content items identified by the first set of results and by a first page of said first web site both refer to a same URL, the same URL differing from URLs identifying said content item and said first page;
based on said determining, augmenting said first set of pages with said first page; and
providing said augmented first set of pages to a user.

11. The method of claim 10, wherein said second query is not equivalent to said first query.

12. The method of claim 10, wherein said second query is different from said first query.

13. The method of claim 10, wherein said search provider comprises a second web site different from said first web site, and wherein further said search provider searches only content from said second web site.

14. The method of claim 10, wherein said search provider comprises a general web search engine.

15. A method of augmenting results of a search, the method comprising:
using a processor to perform acts comprising:
receiving a search request that comprises a first query comprising search terms, wherein the search request being specifically directed only to a first content set;
searching only a first portion of an index, said first portion corresponding to said first content set, to identify a first set of results of content items in said first content set, wherein the searching only the first portion of the index can only satisfy a portion of search terms of the first query;
generating a second query comprising, or derived from, the search terms of the first query not included in the satisfied search of the first portion of the index;
searching a second portion of said index, said second portion corresponding to one or more content sets different from said first content set, to identify a second set of results that satisfy said second query;
identifying, from said first set of results, a first content item that references an entity and some of the search terms of the first query;
identifying, from said second set of results, a second content item that references the entity, said second content item being distinct from said first content item, said entity being distinct from both said first and second content items;
determining a correspondence between said first content item and said second content item based on said first and second content items both referencing the same entity;
based on said determining, augmenting said first set of results to include said second content item to generate an augmented first set of results; and
providing said augmented first set of results in response to said search request.

16. The method of claim 15, wherein said second query is not equivalent to said first query.

17. The method of claim 15, wherein said first content set comprises a set of pages of a first web site, and wherein said one or more content sets comprises pages of one or more web sites that are different from said first web site.

18. The method of claim 15, wherein said first content item references said entity by comprising a Uniform Resource Locator (URL) identifying a web page of said entity; wherein said second content item references said entity by also comprising said URL identifying said web page of said entity; and wherein further said web page of said entity is independent of said first content set and said second content set.

* * * * *